US 6,655,092 B2

United States Patent
Pacella et al.

(12) United States Patent  
(10) Patent No.: US 6,655,092 B2  
(45) Date of Patent: Dec. 2, 2003

(54) METHOD FOR FABRICATING A VEHICLE DOOR

(75) Inventors: John P. Pacella, Rochester Hills, MI (US); Joseph E. Mrozowski, Clarkston, MI (US); Earl E. Kansier, White Lake, MI (US)

(73) Assignee: ThyssenKrupp Budd Company, Troy, MI (US)

( * ) Notice: Subject to any disclaimer, the term of this patent is extended or adjusted under 35 U.S.C. 154(b) by 0 days.

(21) Appl. No.: 09/910,522

(22) Filed: Jul. 20, 2001

(65) Prior Publication Data

US 2002/0007599 A1 Jan. 24, 2002

Related U.S. Application Data

(60) Provisional application No. 60/220,353, filed on Jul. 24, 2000.

(51) Int. Cl.[7] .................................................. E06B 3/00
(52) U.S. Cl. ............................ 49/506; 49/374; 49/349; 49/502
(58) Field of Search ..................... 49/372, 376, 348, 49/349, 506, 502

(56) References Cited

U.S. PATENT DOCUMENTS

| | | | | |
|---|---|---|---|---|
| 2,336,530 A | * | 12/1943 | Chandler et al. | 49/349 |
| 2,710,058 A | * | 6/1955 | Gronlund et al. | 160/103 |
| 2,714,004 A | * | 7/1955 | Wise | 49/349 |
| 2,756,991 A | * | 7/1956 | Busdiecker | 74/89.4 |
| 2,913,920 A | * | 11/1959 | Wise | 74/424.9 |
| 2,914,315 A | * | 11/1959 | Wise | 49/349 |
| 3,125,334 A | * | 3/1964 | Lohr | 49/358 |
| 3,423,876 A | * | 1/1969 | Smith | 49/227 |
| 3,568,366 A | * | 3/1971 | Carella | 49/349 |
| 4,170,847 A | * | 10/1979 | Pickles | 49/349 |
| 4,417,419 A | | 11/1983 | Rossie et al. | |
| 4,503,639 A | | 3/1985 | Rossie et al. | |
| 4,785,585 A | | 11/1988 | Grier et al. | |
| 4,831,710 A | | 5/1989 | Katoh et al. | |
| 4,934,099 A | * | 6/1990 | Maekawa et al. | 49/352 |
| 4,970,827 A | | 11/1990 | Djordjevic | |
| 5,012,613 A | * | 5/1991 | Sekine | 49/362 |
| 5,033,236 A | * | 7/1991 | Szerdahelyi et al. | 49/502 |
| 5,086,589 A | * | 2/1992 | Dibenedetto | 49/502 |
| 5,226,259 A | * | 7/1993 | Yamagata et al. | 49/502 |
| 5,308,138 A | * | 5/1994 | Hlavaty | 296/146.6 |
| 5,647,171 A | * | 7/1997 | Wirsing et al. | 49/502 |
| 5,673,515 A | * | 10/1997 | Weber et al. | 49/352 |
| 5,806,244 A | * | 9/1998 | Filli | 49/358 |
| 5,867,942 A | * | 2/1999 | Kowalski | 49/502 |
| 5,907,897 A | * | 6/1999 | Hisano | 29/434 |
| 5,927,021 A | * | 7/1999 | Kowalski et al. | 49/502 |
| 5,964,063 A | * | 10/1999 | Hisano et al. | 49/502 |
| 6,216,394 B1 | * | 4/2001 | Fenelon | 49/349 |
| 6,223,472 B1 | * | 5/2001 | Ishikawa et al. | 49/502 |
| 6,283,534 B1 | | 9/2001 | Mrozowski et al. | |

OTHER PUBLICATIONS

Article "Making Cars in Overdrive" Canadian Machinery and Metalworking, Nov. 1999.

* cited by examiner

Primary Examiner—Gregory J. Strimbu
(74) Attorney, Agent, or Firm—Harness, Dickey & Pierce, P.L.C.

(57) ABSTRACT

A method of fabricating a vehicle door includes providing a lower door structure, providing an upper door structure having a pair of spaced apart frame rails, installing a window member between the frame rails, installing a window regulator to the window member and the upper door structure, and coupling the lower and upper door structures to one another. The window regulator may include a powered lead screw regulator, a rack and pinion regulator or a cable and drum regulator.

4 Claims, 5 Drawing Sheets

METHOD FOR FABRICATING A VEHICLE DOOR

CROSS-REFERENCE TO RELATED APPLICATIONS

This application claims the benefit of U.S. Provisional Application No. 60/220,353, filed Jul. 24, 2000.

FIELD OF THE INVENTION

The present invention generally relates to vehicle door systems. More particularly, the present invention relates to vehicle door systems having a compact and easily packaged window regulator unit wherein the window regulator and window are preassembled to an upper portion of the vehicle door that is subsequently assembled to a lower portion of the vehicle door.

BACKGROUND OF THE INVENTION

Various arrangements of automotive window regulator and drive arrangements have been developed over the years. These arrangements vary widely from complex lever arm and gear configurations to rack-and-pinion and cable-and-drum type drive arrangements. Most of these arrangements employ numerous parts, which collectively consume a large volume in the vehicle door, which tends to inhibit the ease with which the regulator is packaged into an application.

Another drawback associated with many of the known window regulating arrangements concerns the ease with which they are integrated into several vehicle models. It is not uncommon for several of the components of a window regulating arrangement to differ for each application on a vehicle, on each model of a vehicle and/or between vehicle types, necessitating additional cost associated with the design, manufacture and stocking of a plurality of similarly designed window regulators.

Accordingly, there remains a need in the art for an automotive window regulator which is relatively compact in nature and which may be easily integrated into a vehicular application without consuming a large amount of volume. There also remains a need in the art for an automotive window regulator, which may be adapted for use on a variety of applications without extensive variation. There also remains a need in the art for a method for fabricating a vehicle door that fully utilizes the advantages of a compact window regulator unit to improve produce the vehicle door in a more efficient manner.

SUMMARY OF THE INVENTION

In one preferred form, the present invention provides a method for fabricating a vehicle closure member. The method includes the steps of: providing a discrete lower door structure that is adapted to be pivotally coupled to the vehicle body and movable between a first position and a second position that substantially clears the door aperture; providing a discrete upper door structure having a pair of spaced apart frame rails that define a window aperture; installing a window member between the frame rails; installing a window regulator to the window and the upper door structure, the window regulator being operable for moving the window between a closed position substantially closing the window aperture and an open position at least partially clearing the window aperture; and coupling the lower and upper door structures to one another after the step of installing the window regulator.

In another preferred form, the present invention provides a closure member for substantially closing the door aperture. The closure member includes a lower door structure, an upper door structure, a window member and a regulator mechanism. The lower door structure is configured to be pivotally coupled to the vehicle body and movable between a first position and a second position substantially clearing the door aperture. The upper door structure includes a pair of spaced apart frame rails that define a window aperture. The window member is disposed between the frame rails and movable relative to the frame rails between a closed position substantially closing the window aperture and an open position at least partially clearing the window aperture. The window regulator is coupled to the window member and the upper door structure and includes a pair of attachment brackets and a drive arrangement. The attachment brackets are coupled to the window member and spaced apart in a direction that is transverse to a direction in which the window member travels. The drive arrangement includes a pair of racks and a pair of drive assemblies, with each of the racks having a plurality of rack teeth and being fixedly coupled to an associated one of the frame rails. Each of the drive assemblies has a housing and a pinion gear that is rotatably coupled to the housing and the housing is coupled to an associated one of the attachment brackets. The pinion gear engages the rack teeth of an associated one of the racks and rotates in response to a rotary input to selectively translate the attachment brackets relative to the frame rails.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
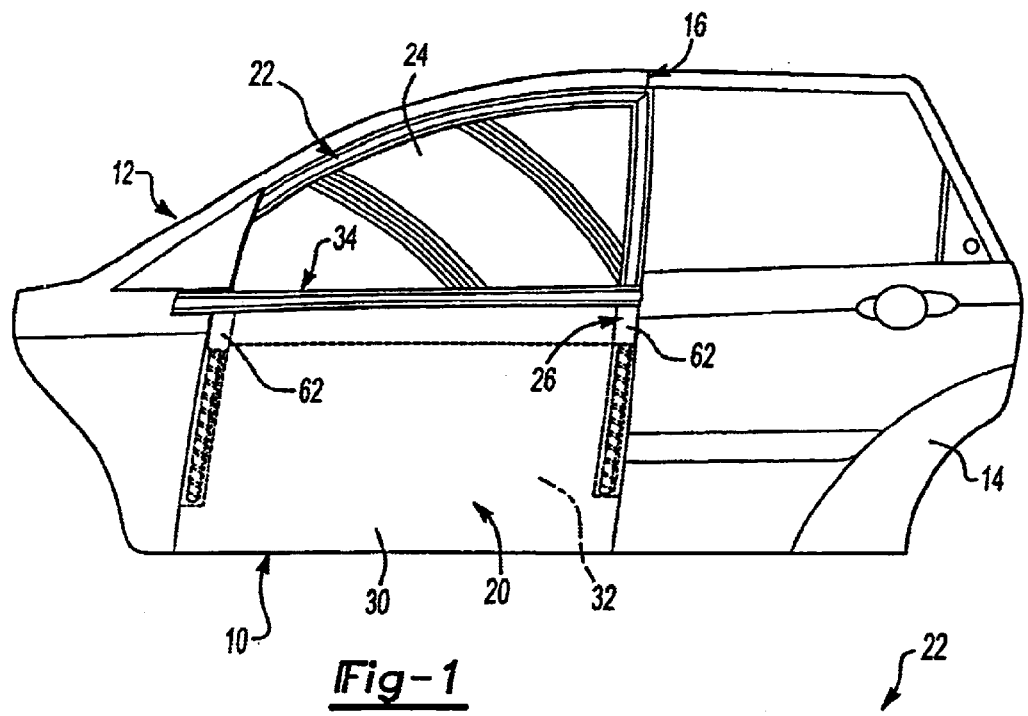
FIG. 1 is a side view of a portion of an automotive vehicle having a vehicle closure assembly constructed in accordance with the teachings of the present invention.

With reference to FIG. 1 of the drawings, a vehicle closure assembly constructed in accordance with the teachings of the present invention is generally indicated by reference numeral 10. Vehicle closure assembly 10 is shown to be operatively associated with a vehicle 12. Vehicle 12 includes a vehicle body 14 having a door aperture 16. Vehicle closure assembly 10 is pivotably coupled to vehicle body 14 via a set of hinges (not specifically shown) to permit vehicle closure assembly 10 to substantially close or substantially clear door aperture 16.

Figure 2:
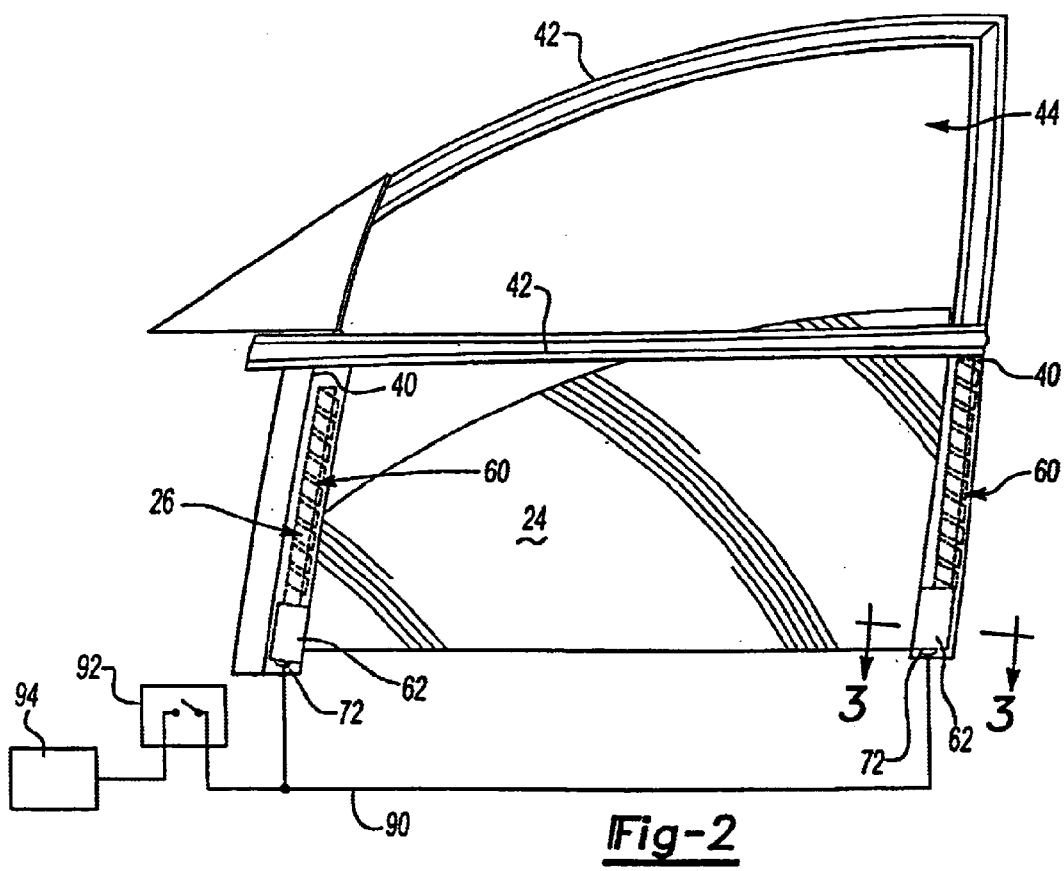
FIG. 2 is a perspective view of a portion of the vehicle closure assembly illustrated in FIG. 1.

With additional reference to FIG. 2, vehicle closure assembly 10 is shown to include a lower door assembly 20, an upper door structure 22, a window member 24 and a regulator mechanism 26. The lower door assembly 20 includes a lower door structure 30 that defines a generally hollow central cavity 32 and a frame aperture 34 through which the upper door structure 22 is disposed. The lower door structure 30 is pivotally coupled to the vehicle body 14 via a pair of hinges (not shown) such that the lower door assembly 20 may be pivoted between a first position, which is illustrated in FIG. 1, and a second position that substantially clears the door aperture 16.

The upper door structure 22 is illustrated to have a pair of spaced apart frame rails 40 and a pair of transversely-extending frame members 42 that are fixedly coupled to the opposite ends of the frame rails 40. The frame rails 40 and frame members 42 cooperate to define a window aperture 44. With additional reference to FIG. 3, the frame rails 40 are illustrated as being formed from a tubular member 46 and a channel member 48 that defines a longitudinally-extending slot 50 that is formed into the side of the frame rail 40 that abuts the window aperture 44.

The window member 24 is illustrated to be a conventional glass window panel and is disposed in the window aperture 44 between the slots 50 in the frame rails 40, being slidingly engaged with the frame rails 40. The frame rails 40 are operable for guiding the window member 24 between a closed position, as shown in FIG. 1, wherein the window member 24 substantially closes the window aperture 44, and an open position, as shown in FIG. 2, wherein the window member 24 at least partially clears the window aperture 44.

Figure 3:
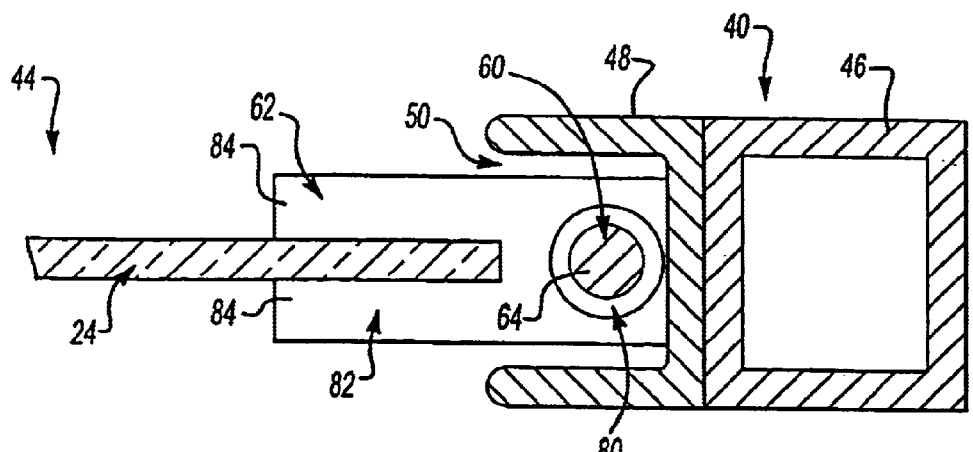
FIG. 3 is a cross-sectional view taken along the line 3—3 of FIG. 2.
Figure 4:
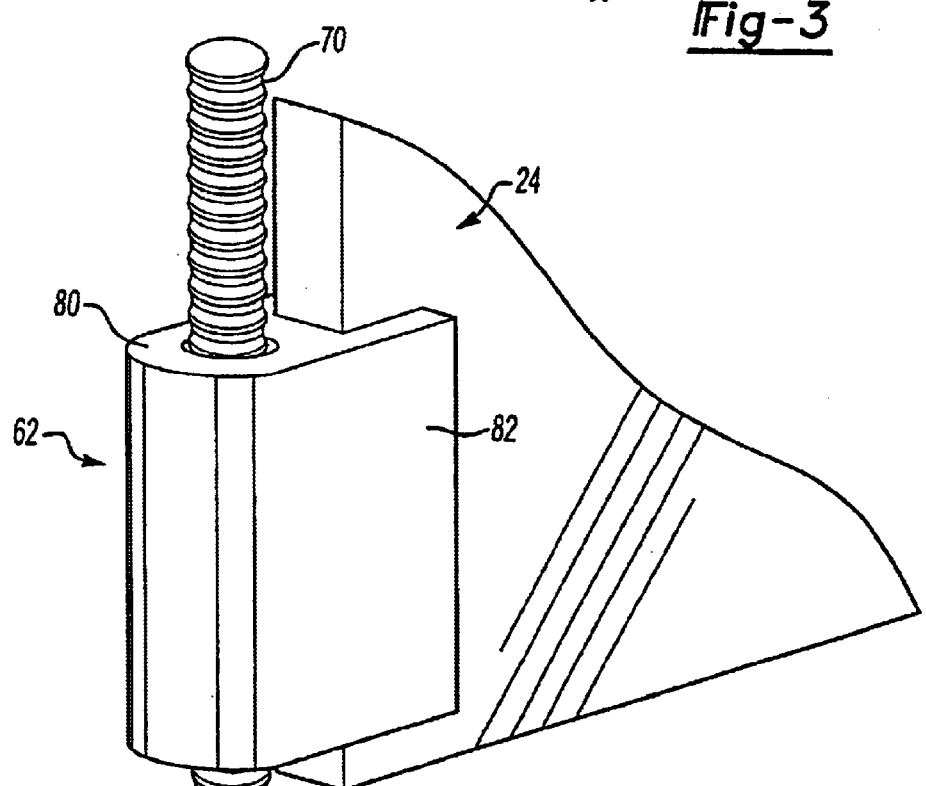
FIG. 4 is a perspective view of a portion of the vehicle closure assembly of FIG. 1 illustrating the drive mechanism in greater detail.

The regulator mechanism 26 includes a drive arrangement 60 and a pair of attachment brackets 62. In the particular embodiment illustrated, the drive arrangement 60 has a pair of worm screw assemblies 64, each of which is coupled to one of the pair of attachment brackets 62. As best shown in FIGS. 3 and 4, each of the worm screw assemblies 64 includes a worm screw 70 and a drive motor 72, with the worm screw 70 being coupled for rotation with an output shaft 74 of the drive motor 72. As illustrated, each of the worm screw assemblies 64 is generally vertically arranged, with the drive motor 72 being fixedly mounted to the upper door structure 22 and the worm screw 70 being at least partially disposed within the longitudinally-extending slot 50 in a respective one of the frame rails 40.

Each of the attachment brackets 62 includes a first coupling portion 80 and a second coupling portion 82 which are coupled to one another. The worm screw 70 is disposed through and threadably engages the first coupling portion 80 of a respective one of the attachment brackets 62. The second coupling portion 82 is adapted to be coupled to the window member 24 to thereby couple the window member 24 with its respective worm screw assembly 64. In the particular embodiment illustrated in FIG. 3, the second coupling portion 82 is U-shaped, having spaced apart furcations 84 that are adhesively coupled to window member 24. However, those skilled in the art will understand that any suitable coupling means for connecting the window member 24 to the first coupling portion 80 may be employed and as such, the present invention will not be limited in scope to attachment brackets which are adhesively coupled to a closure panel.

Returning to FIG. 2, the drive motors 72 are coupled in a parallel manner through a wire harness 90 to a switch 92 and an electrical power source, such as a vehicle battery 94. Actuation of the switch 92 closes an electrical circuit, permitting the drive motors 72 to simultaneously rotate their respective worm screws 70. The attachment brackets 62 cannot rotate freely with their respective worm screws 70 as they are fixedly coupled to the window member 24. Accordingly, rotation of the worm screws 70 causes the attachment brackets 62 to move axially along their respective worm screw 70 and thereby translate the window member 24 in a corresponding direction.

Configuration of the upper door structure 22 and the regulator mechanism 26 in this manner is highly advantageous in that since the frame rails 40 guide both the window member 24 and the attachment brackets 62, separate rails for guiding the attachment brackets 62 are not required. Consequently, the regulator mechanism 26 consumes relatively less space within the vehicle closure assembly 10, is lighter in weight and lower in cost.

The compact nature of the regulator mechanism 26, along with the modularity of the lower and upper door structures 20 and 22, promotes the efficient fabrication of the vehicle closure assembly 10. In this regard, the window member 24 and regulator mechanism 26 may be installed to the upper door structure 22 to form a cassette-like assembly that is subsequently coupled to the lower door structure 20. In the particular example provided, the lower and upper door structures 20 and 22 are fixedly coupled to one another via a conventional fastening means, such as threaded fasteners or welding. Alternatively, the upper door structure 22 may be pivotally coupled to the lower door structure 30 as is described in commonly assigned co-pending U.S. patent application Ser. No. 09/624,704 entitled "Active Door Upper", now U.S. Pat No. 6,283,534, and U.S. patent application Ser. No. 09/756,666 entitled "Active Door Upper", now U.S. Pat. No. 6,561,567, the disclosures of which are hereby incorporated by reference as if fully set forth herein.

Figure 5:
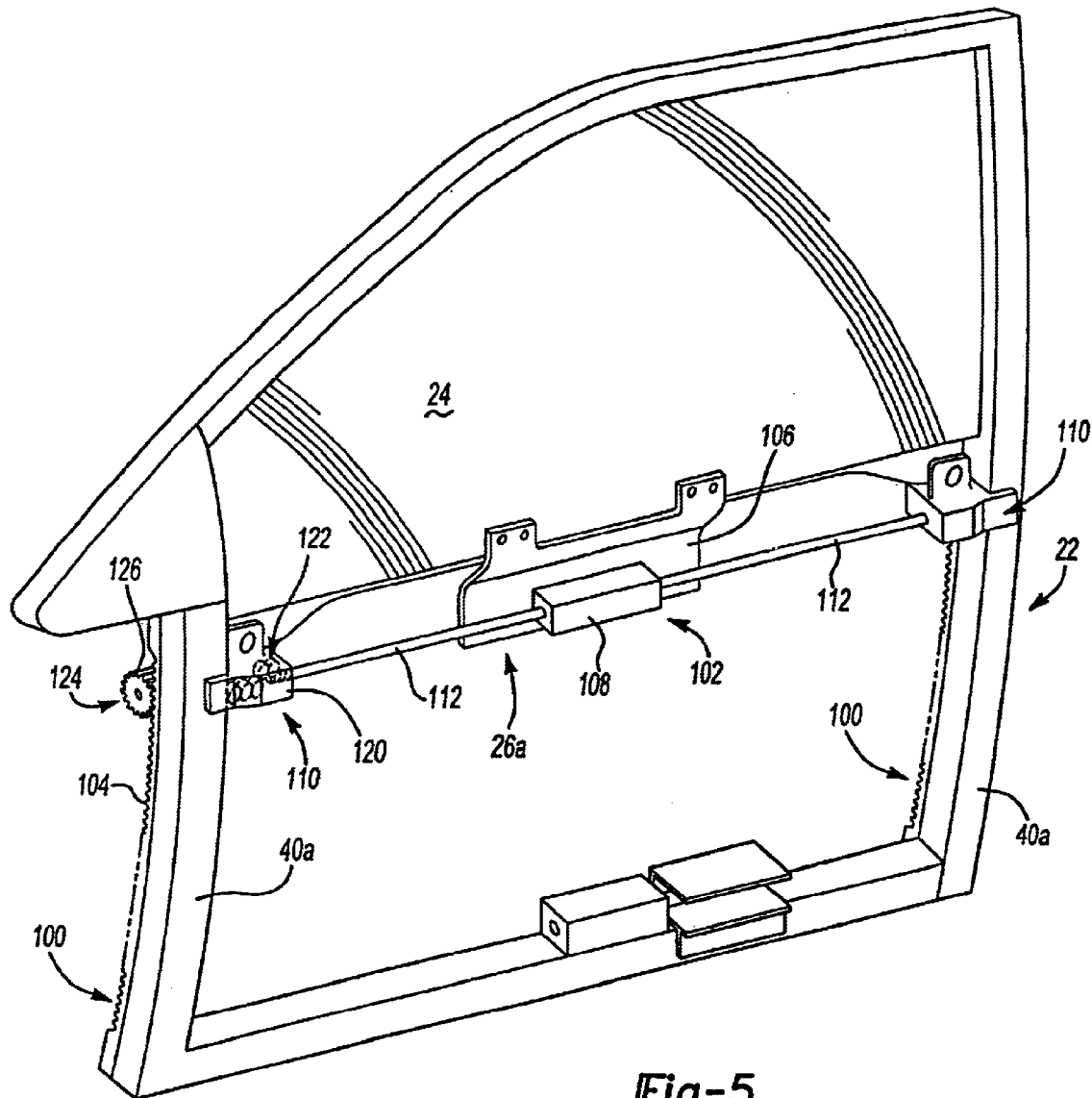
FIG. 5 is a view similar to that of FIG. 2 but illustrating a second drive mechanism.

While the vehicle closure assembly 10 has been described thus far as having a regulator mechanism that employs a pair of lead screws for translating a window member, those skilled in the art will appreciate that the invention, in its broader aspects, may be constructed somewhat differently. For example, the regulator mechanism may employ a toothed rack as shown in FIG. 5. In this arrangement, the regulator mechanism 26a includes a pair of racks 100 and a drive arrangement 102. Each rack 100 is fixedly coupled to one of the frame rails 40 and includes a plurality of rack teeth 104. In the embodiment illustrated, the drive arrangement 102 includes a bracket 106, a drive motor 108, and a pair of drive assemblies 110. The bracket 106 is fixedly coupled to the window member 24 and supports the drive motor 108 relative to the window member 24. The drive motor 108 is a reversible-type motor and is illustrated to include two output shafts 112 that are configured to transmit rotary power to the drive assemblies 110. Each of the drive assemblies 110 includes a housing 120, which is coupled to the window member 24, and a gear train 122 that is at least partially housed in the housing 120. Each gear train 122 includes an output pinion 124 having a plurality of pinion teeth 126 that are meshingly engaged with the rack teeth 104. Rotary power transmitted through each output shaft 112 is received by an associated one of the gear trains 122 and transmitted to its pinion gear 124 to thereby initiate movement of the drive assembly 110 relative to the rack 100.

Figure 6:
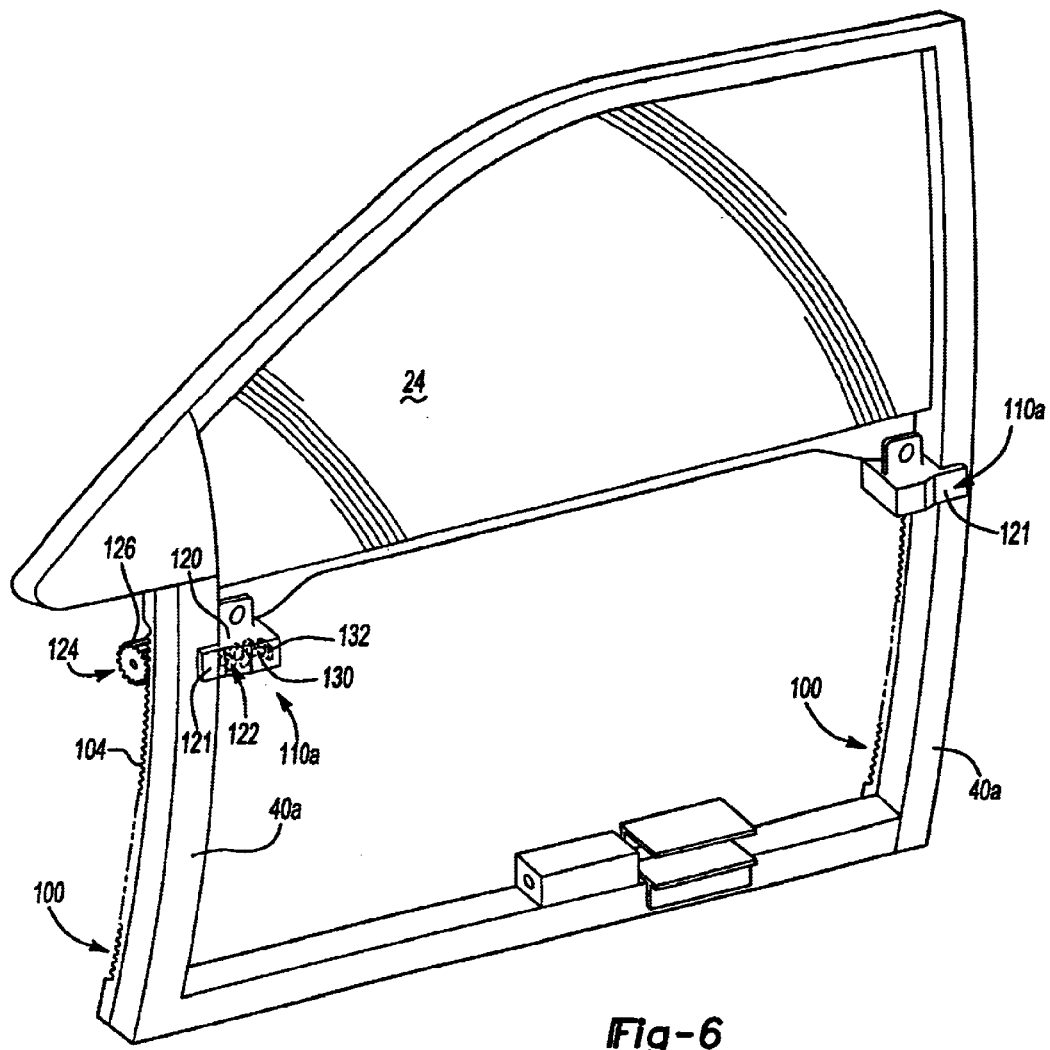
FIG. 6 is a view similar to that of FIG. 2 but illustrating the use of a third drive mechanism.

FIG. 6 illustrates an embodiment that is similar to that of FIG. 5, but which utilizes independent motor assemblies 130 rather than a common motor 108. In this regard, each of the drive assemblies 110a is generally similar to the drive assembly 110, except that a motor assembly 130 is also housed in the housing 120. Each housing 120 includes an attachment bracket 121 engaging a respective one of the frame rails 40a. Each motor assembly 130 includes a controller 132 that controls its operation. This arrangement is highly advantageous in that it may be more easily packaged into a vehicle door and eliminates concerns regarding the alignment of the output shafts 112 relative to the gear train 122. Separate control of each gear train 122 may be employed to make subtle adjustments to the position of the pinion gears 124 relative to their rack 100 so as to eliminate or substantially reduce binding between the various components when the window member 24 is moved between the closed and open positions.

Figure 7:
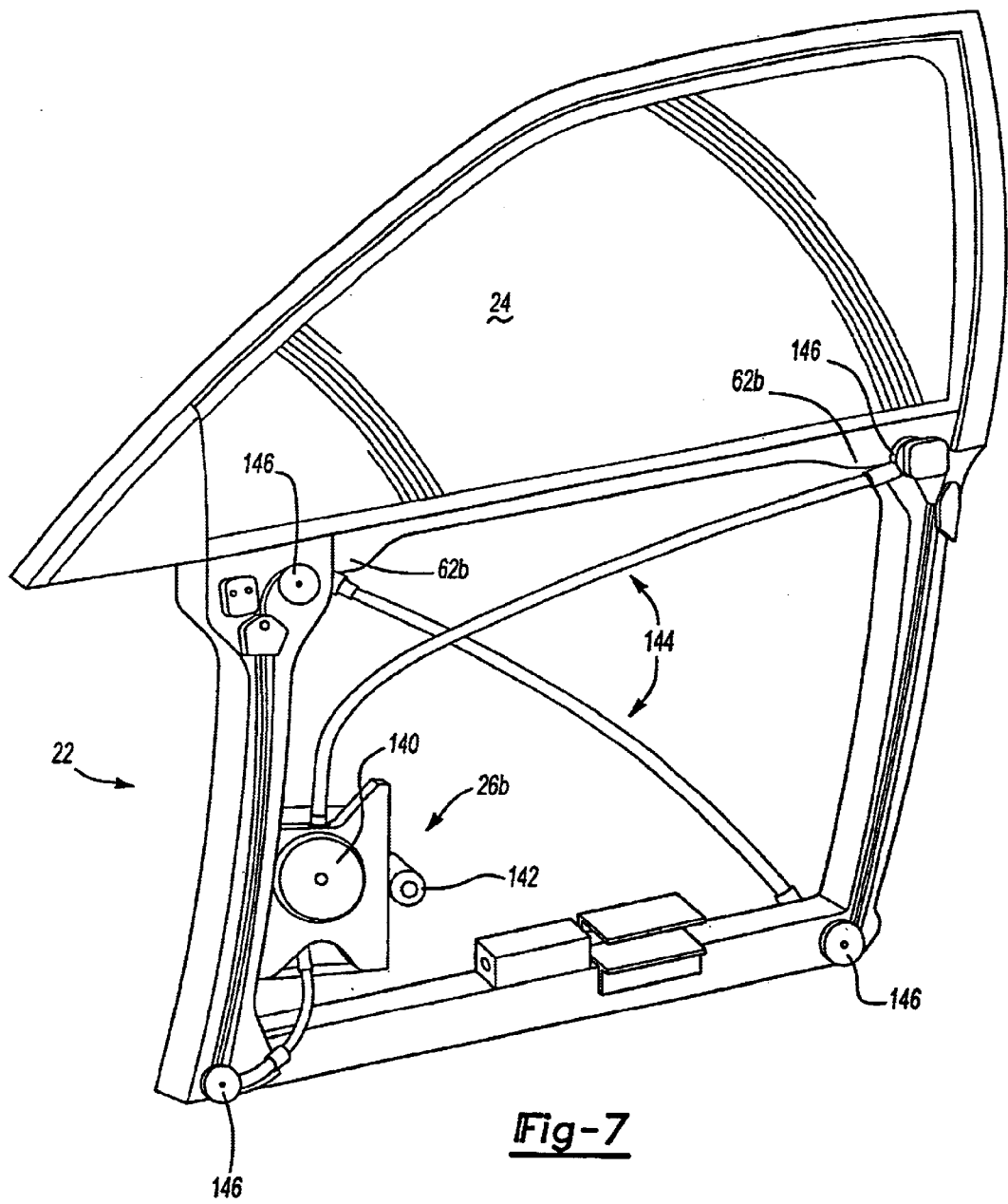
FIG. 7 is a view similar to that of FIG. 2 but illustrating the use of a fourth drive mechanism.

FIG. 7 illustrates yet another embodiment of the present invention wherein the regulator mechanism 26b is a conventionally constructed and operated cable-and-drum type window regulator. This type of regulator mechanism is well known in the art and as such, a detailed discussion of it is not necessary. Briefly, the regulator mechanism 26b includes a drum 140, a drive motor 142 and a cable assembly 144. The drive motor 142 includes a housing (not specifically shown) that is fixedly coupled to the upper door structure 22 and an output shaft (not specifically shown) that rotatably supports the drum 140. The cable assembly 144 is coupled to the attachment brackets 62b, routed through a plurality of pulleys 146 that are coupled to the upper door structure 22 and wrapped around the drum 140. Rotation of the drum 140 in a first rotational direction applies tension to one side of the cable assembly 144, causing the window member 24 to move in a corresponding first direction. Rotation of the drum 140 in a second rotational direction applies tension to a second side of the cable assembly 144 opposite the first side, causing the window member 24 to move in a corresponding second direction opposite the first direction.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for fabricating a vehicle closure member, the method comprising the steps of:

provinding a discrete lower door structure that is adapted to be pivotally coupled to a vehicle body and movable between a first position and a second position that substantially clears a door aperture;

providing a discrete upper door structure having a pair of spaced apart frame rails that define a window aperture;

installing a window member between the frame rails;

installing a window regulator to the window member and the upper door structure, the window regulator being operable for moving the window member between a closed position substantially closing the window aperture and an open position at least partially clearing the window aperture, wherein the window regulator includes a pair of rack and pinion mechanisms and a pair of drive motors, each rack and pinion mechanism interconnecting a respective one of said frame rails and the window member and said rack and pinion mechanisms being spaced apart in a direction that is transverse to a direction in which the window member travels, each drive motor being independently coupled to a respective one of the rack and pinion mechanisms and operable for selectively translating the window member relative to the window aperture; and coupling the lower and upper door structures to one another after the step of installing the window regulator.

2. The method of claim 1, further comprising the step of controlling the drive motors.

3. The method of claim 1, wherein the window regulator includes a first controller coupled to one of the drive motors and a second controller coupled to the other of the drive motors, wherein each controller independently signals the associated drive motor to position the associated pinion relative to its rack.

4. The method of claim 1, wherein each rack and pinion mechanism includes an attachment bracket engaging the a respective one of the frame rails.

* * * * *